Oct. 17, 1961    R. L. ATKIN    3,004,795
WHEEL AND BRAKE DRUM ASSEMBLY
Filed May 19, 1958    2 Sheets-Sheet 1
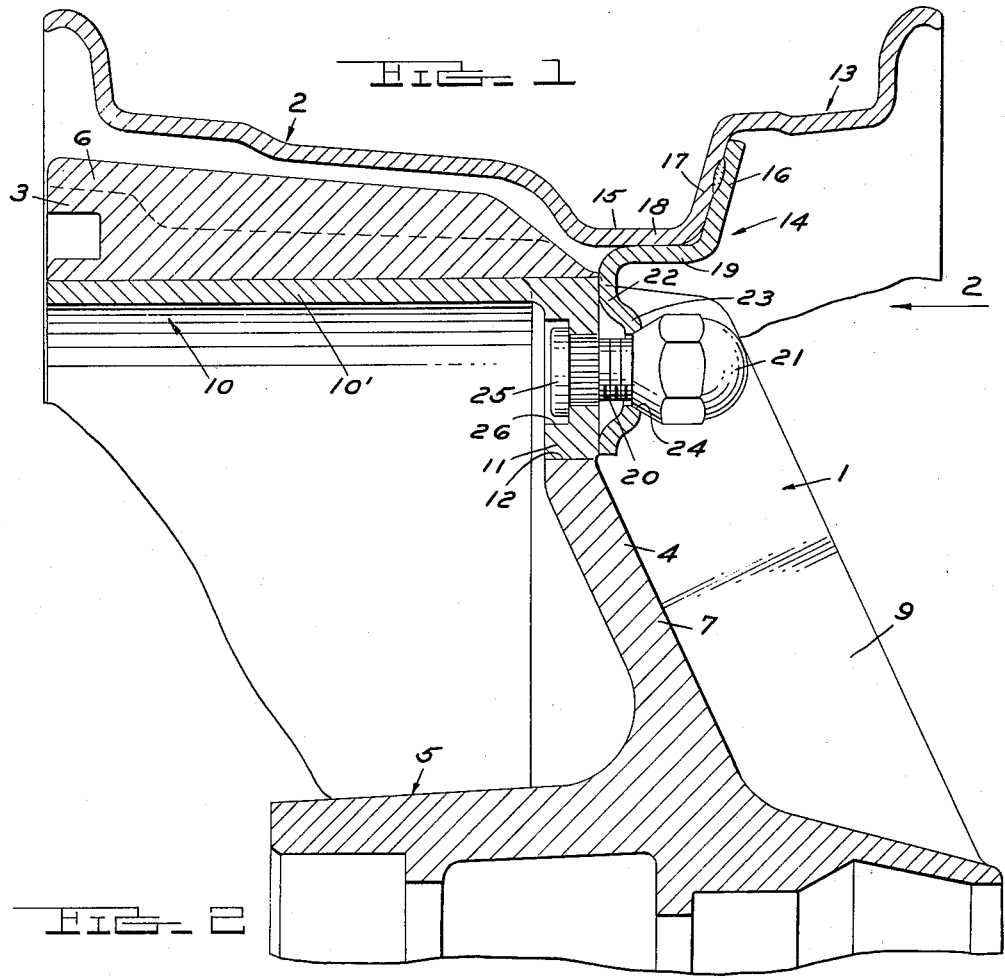
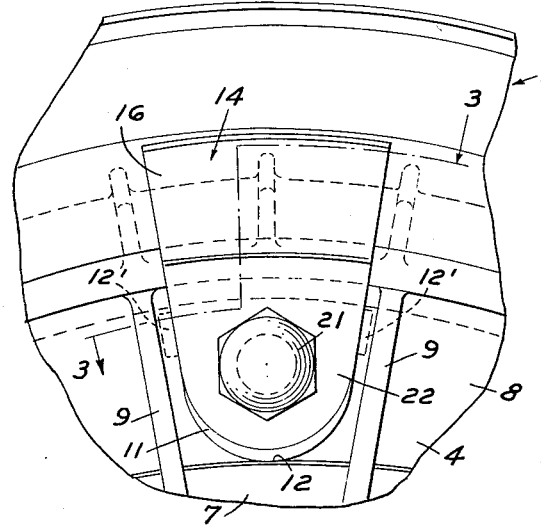
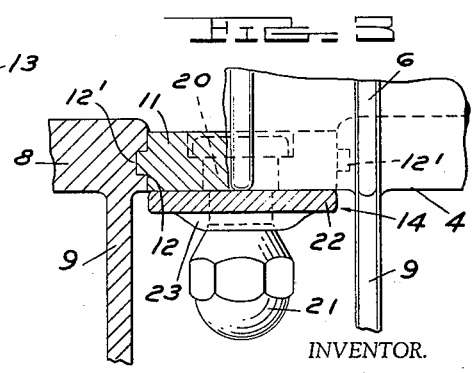
INVENTOR.
RUPERT L. ATKIN
BY
Whittemore, Hulbert & Belknap
ATTORNEYS

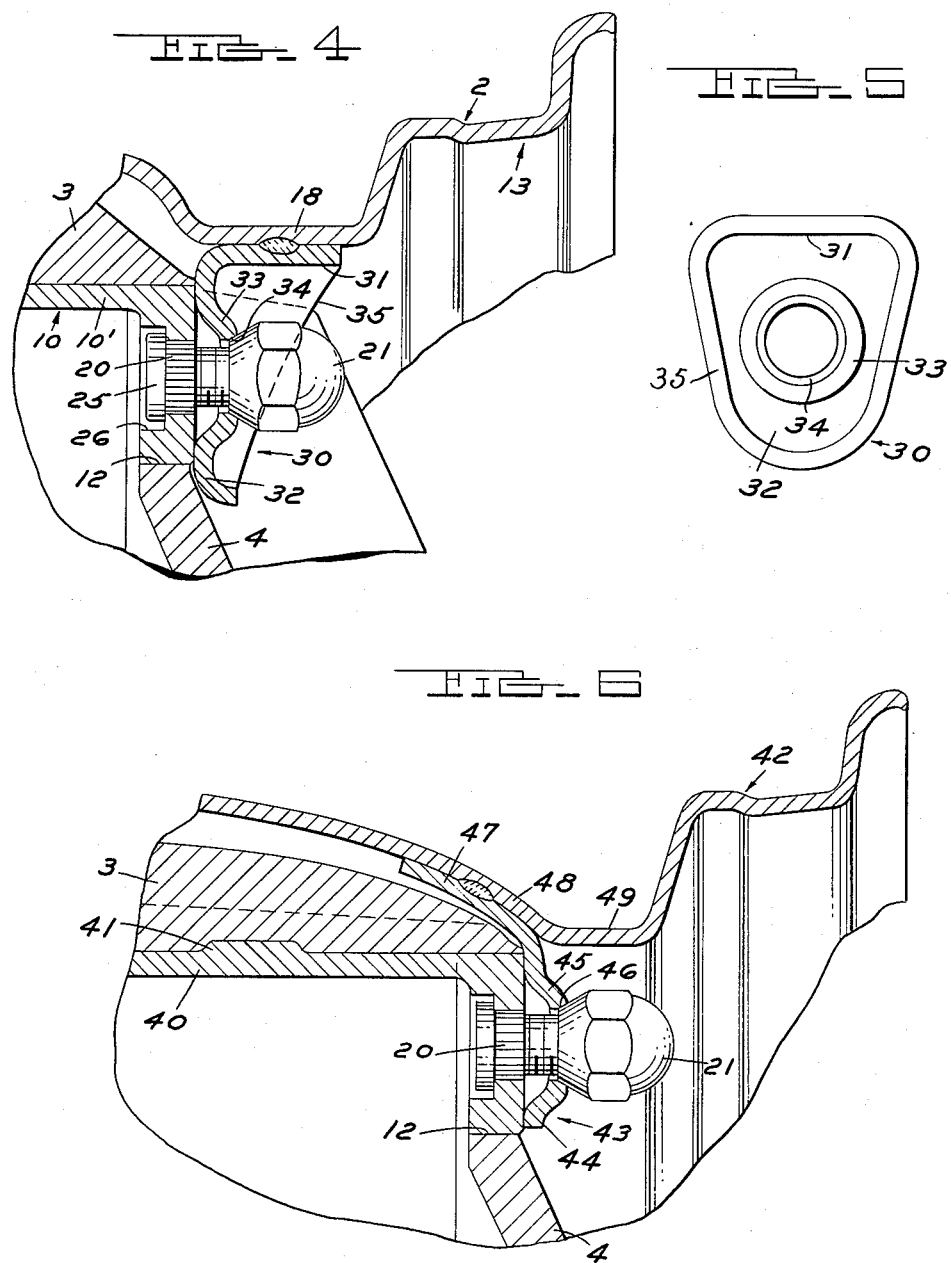

3,004,795
WHEEL AND BRAKE DRUM ASSEMBLY
Rupert L. Atkin, Grosse Pointe Woods, Mich., assignor to Kelsey-Hayes Company, Detroit, Mich., a corporation of Delaware
Filed May 19, 1958, Ser. No. 736,053
17 Claims. (Cl. 301—6)

This invention relates to wheel and brake drum assemblies and refers more particularly to assemblies of the type in which the wheel structure and the brake drum are secured to each other.

The invention has for one of its objects to provide a wheel and brake drum assembly in which the brake drum is relatively light in weight, has high heat transfer characteristics and provides a rigid mounting for the wheel structure.

The invention has for another object to provide a wheel and brake drum assembly in which the brake drum has an annular flange and a liner within and secured to the flange, and the wheel structure is mounted directly on the liner.

The invention has for a further object to provide a wheel and brake drum assembly in which the brake drum comprises a shell formed of a material which is relatively light in weight, has high heat transfer characteristics, and is provided with a brake liner of a material harder than the shell to which the wheel structure is secured.

These and other objects of the invention will become apparent from the following description taken in connection with the accompanying drawings in which:

FIG. 1 is a radial section of a wheel and brake drum assembly embodying the invention.

FIG. 2 is a fragmentary elevation, in the direction of the arrow 2 of FIG. 1.

FIG. 3 is a section on the line 3—3 of FIG. 2.

FIG. 4 is a fragmentary section similar to FIG. 1 showing a modification.

FIG. 5 is an elevation of a tab looking from the right in FIG. 4.

FIG. 6 is similar to FIG. 4 and shows another modification.

Referring to FIGS. 1–3, 1 is the brake drum and 2 is the wheel structure. The brake drum is a cast element in the form of a shell having the integral annular flange 3 and web 4. This shell is cast integrally with the hub 5 of aluminum or magnesium, which are relatively light in weight and have high heat transfer characteristics. While aluminum or magnesium are preferred, other materials having similar characteristics may be employed. The annular flange 3 is formed with a series of circumferentially spaced heat dissipating ribs 6 cast integrally with the flange. The web 4 has a portion 7 connecting into the hub 5 and inclined from the hub in an inboard direction, and a radial portion 8. Radial ribs 9 are provided on the outboard side of the web, cast integrally with the web and hub.

10 is a cast iron liner having an annulus 10' bonded to the inner surface of flange 3 for engagement by a suitable friction device, not shown. The liner has a plurality of projecting portions 11 spaced equal distances apart along the edge of the annulus adjacent the web 4. The projecting portions 11 are cast integrally with the annulus and extend into openings 12 in the web which are shaped to closely receive and firmly anchor the portions 11. The sides of the projecting portions 11 have integral ribs 12' which extend into the metal of the web.

The brake drum shell and hub may be formed by casting in a sand or permanent mold or by die casting, for example. Preferably the liner 10 is placed in the mold prior to casting and the brake drum shell is cast around the liner. The projecting portions 11 are closely received in openings 12 to mechanically lock the liner against rotation relative to the shell, and the ribs 12' extending into the web at opposite sides of openings 12 mechanically lock the liner against axial movement relative to the shell. During casting of the shell and hub, a molecular bond is obtained between the liner and shell on all contacting surfaces. Thus the annulus 10' is bonded to the flange 3 throughout the full 360° of contact, and the projecting portions 11 are bonded to the openings 12. This strong bond cooperates with the mechanical lock to hold the liner against movement relative to the shell. The surfaces of the liner may be initially treated to promote bonding by a process known in the art and described in U.S. Patent No. 2,396,730.

According to this process, when an aluminum shell is to be cast, the surfaces of the liner to which the shell is to be bonded are first cleaned to remove all foreign matter which would interfere with the formation of a strong bond. The remaining surface area of the liner should be covered with a suitable stop-off preparation so that it will not be acted upon during the process. The liner is then dipped in a bath of molten aluminum for a sufficient time and at a proper temperature to cause the aluminum to alloy with the ferrous metal of the liner and form a thin iron-aluminum alloy bond on the liner. The liner is then quenched in a molten bath of aluminum and silicon to arrest the formation of the iron-aluminum alloy bond on the surface of the liner. After quenching, the liner, while still wetted by molten aluminum, is transferred to a mold where molten aluminum is poured to cast the brake drum shell and hub. The brake drum shell is cast on the wet aluminum skin overlying the thin iron-aluminum alloy on the liner and a strong molecular bond is obtained. In some instances the quench may be omitted and the liner transferred immediately from the first bath to the casting mold. The molecular bond permits heat in the liner to pass readily into the shell for dissipation to the air.

A similar process may be employed for obtaining a molecular bond between a magnesium brake drum shell and cast iron liner.

The wheel structure 2 comprises an annular tire rim 13 and mounting tabs 14. The rim 13 encircles the brake drum and is formed with a well 15. The tabs 14 have the upper generally radial end portions 16 secured to the side wall 17 of the well in equally spaced relation about the rim by any suitable means, such as welding. The base 18 of the well is supported on the generally axially extending seat portions 19 of the tabs which connect into the lower ends of the radial end portions 16.

By means of the tabs 14, the rim is detachably secured to the brake drum with bolts 20 and nuts 21, so that the web of the drum serves the additional function of a wheel center. Each tab has a radial lower end portion 22 which overlies an opening 12 in the web of the drum, and each end portion 22 has a central boss 23 formed with an opening 24. A bolt 20 extends through a hole in the projecting portion 11 in each opening 12 and through the opening 24 in the tab. The heads 25 of the bolts seat against the bottoms of recesses 26 of the projecting portions 11, and the nuts 21 are threaded on the outer ends of the bolts and bear against the bosses 23 of the tabs to draw the tabs firmly against the radially outboard sides of the projecting portions.

The aluminum or magnesium brake drum shell and hub casting is light in weight and has high heat transfer characteristics. This provides a lighter weight wheel structure and permits more rapid dissipation of heat from the brake drum. Moreover, the cast iron liner is much harder than the material of the shell and hub casting and is more resistant to indentation or deformation, thereby providing a strong, rigid support for the wheel structure. The openings 12 anchor or lock the projecting portions 11 in place.

FIGS. 4 and 5 show a modification which is like FIGS. 1–3 except for the mounting tabs 30. Each tab 30 has a generally axially extending portion 31 welded to the bottom wall 18 of the rim well. Each tab also has the radial lower end portion 32 which overlies an opening 12 in the web of the drum and which has a central boss 33 formed with an opening 34 for receiving a bolt 20. The tabs are cup-shaped, having an axially extending rim 35 extending downwardly from the opposite edges of the portion 31 along the sides and bottom of the radial portion 32. Otherwise, the construction of FIGS. 4 and 5 is like FIGS. 1–3.

FIG. 6 shows another modification. The liner 40 is like liner 10 except that it has an annular rib 41 on its outer bonded surface extending into the material of the drum shell flange to assist the bond in holding the liner against axial movement relative to the drum shell. In this form, ribs 12' employed in FIGS. 1–5 may be omitted. The rim 42 is generally similar to rim 13 although of slightly different shape. The mounting tabs 43 each have the radial lower end portion 44 which overlies an opening 12 in the web of the drum and which has a central boss 45 formed with an opening 46 for receiving bolt 20. The tabs have the portions 47 extending from the portions 44 radially outwardly and axially inwardly. The portions 47 are welded to the side wall 48 of the gutter 49 of the rim. Otherwise, the FIG. 6 construction is like FIGS. 1–3.

What I claim as my invention is:

1. In a wheel and brake drum assembly, a brake drum having a web and an annular flange, a liner having an annulus within and secured to said flange and having a portion projecting into an opening in said web, a wheel structure including a rim concentric with said drum, and means for clamping said wheel structure directly to said projecting portion.

2. In a wheel and brake drum assembly, a brake drum having a web and an annular flange, a liner having an annulus within and secured to said flange, circumferentially spaced openings in said web adjacent said annulus, said liner having portions projecting from said annulus into said openings, a wheel structure comprising a rim concentric with said drum and mounting tabs secured to said rim, and means for clamping said mounting tabs directly to said projecting portions.

3. In a wheel and brake drum assembly, a brake drum comprising a shell of a relatively lightweight material having high heat transfer characteristics, said shell having a web and an annular flange, a cast iron liner having an annulus within and bonded to said flange, said liner being harder than said shell having greater resistance to indentation and deformation, circumferentially spaced openings in said web adjacent said annulus, said liner having portions projecting from said annulus into said openings and anchored therein, a wheel structure comprising a rim concentric with said drum and mounting tabs secured to said rim, and nut and bolt assemblies for clamping said mounting tabs directly to said projecting portions in surface-to-surface contact therewith.

4. In a wheel and brake drum assembly, a brake drum comprising a shell of a relatively lightweight material having high heat transfer characteristics, said shell having a web and an axially extending annular flange at one side of said web, a cast iron liner having an annulus within and bonded to said flange, said liner being harder than said shell having greater resistance to indentation and deformation, circumferentially spaced openings in said web adjacent said annulus, said liner having portions projecting from said annulus into said openings and anchored therein, a wheel structure comprising a rim concentric with said drum and mounting tabs secured to said rim, said tabs being axially aligned with said projecting portions and located at the opposite side of said web, and nut and bolt assemblies for clamping said mounting tabs directly to said projecting portions in surface-to-surface contact therewith, said projecting portions having ribs extending into the material of said web at opposite sides of the associated openings to lock said liner against axial movement relative to said shell.

5. In a wheel and brake drum assembly, a brake drum comprising a shell of a relatively lightweight material having high heat transfer characteristics, said shell having a web and an axially extending annular flange at one side of said web, a cast iron liner having an annulus within and bonded to said flange, said liner being harder than said shell having greater resistance to indentation and deformation, circumferentially spaced openings in said web adjacent said annulus, said liner having portions projecting from said annulus into said openings and anchored therein, a wheel structure comprising a rim concentric with said drum and mounting tabs secured to said rim, said tabs being axially aligned with said projecting portions and located at the opposite side of said web, and nut and bolt assemblies for clamping said mounting tabs directly to said projecting portions in surface-to-surface contact therewith, said annulus having an annular rib on its outer bonded surface extending into the material of said flange to lock said liner against axial movement relative to said shell.

6. In a wheel and brake drum assembly, a brake drum comprising a shell having a web and an annular flange, a liner fixed to said shell and having an annulus within said flange and also having a portion projecting into an opening in said web, a wheel structure including a rim concentric with said drum, and means for mounting said wheel structure on said projecting portion.

7. In a wheel and brake drum assembly, a brake drum comprising a shell having a web and an axially extending annular flange at one side of said web, a liner fixed to said shell and having an annulus within said flange, circumferentially spaced openings in said web adjacent said annulus, said liner having portions projecting from said annulus into said openings and anchored therein, a wheel structure including a rim concentric with said drum, and means for clamping said wheel structure directly to said projecting portions at the opposite side of said web.

8. In a wheel and brake drum assembly, a brake drum having a web, an annular braking member fixed relative to said web and having a portion projecting into an opening in said web, a wheel structure including a rim concentric with said drum, and means for mounting said wheel structure on said projecting portion.

9. In a wheel and brake drum assembly, a brake drum having a web, an annular braking member fixed relative to said web and extending generally axially at one side of said web, circumferentially spaced openings in said web adjacent said braking member, said braking member having portions projecting therefrom into said openings, a wheel structure including a rim concentric with said drum, and means for clamping said wheel structure directly to said projecting portions at the opposite side of said web.

10. In a wheel and brake drum assembly, a brake drum comprising an element having a web, said element being formed of a relatively lightweight material having high heat transfer characteristics, an annular braking member fixed to said element and extending generally axially to one side of said web, said braking member being of a material harder than said element having greater resistance to indentation and deformation, said web having circumferentially spaced openings adjacent said braking member, said braking member having integral portions projecting into said openings and anchored therein, a wheel structure having a rim concentric with said drum and also having mounting portions at the opposite side of said web, and means for clamping said mounting portions of said wheel structure directly to said integral portions of said braking member at said opposite side of said web.

11. In a wheel and brake drum assembly, a brake drum comprising an element having a web, said element being formed of a relatively lightweight material having high heat transfer characteristics, an annular braking member fixed to said element and extending generally axially to one side of said web, said braking member being of a material harder than said element having greater resistance to indentation and deformation, said braking member having an integral portion projecting into an opening in said web, a wheel structure including a rim concentric with said drum, and means for mounting said wheel structure directly to said integral portion of said braking member at the opposite side of said web.

12. In a wheel and brake drum assembly, a brake drum comprising a shell having a web and an annular flange, said shell being formed of a relatively light weight material having high heat transfer characteristics, a cast iron braking member fixed to said shell and having an annulus within said flange, said braking member also having circumferentially spaced mounting portions integral with said annulus, said braking member being harder than said shell having greater resistance to indentation and deformation, a wheel structure including a rim concentric with said drum and mounting tabs secured to said rim in circumferentially spaced relation, said mounting portions of said braking member having radial surfaces on one side disposed in a common radial plane, and means for clamping said tabs to said radial surfaces of said mounting portions in direct surface to surface contacting relation therewith.

13. In a wheel and brake drum assembly as defined in claim 6, said annulus having an annular rib on its outer surface extending into an annular recess in said flange to lock said liner against axial movement relative to said shell.

14. In a wheel and brake drum assembly as defined in claim 8, said portion of said braking member having a rib extending into the material of said web to lock said liner against axial movement relative thereto.

15. In a wheel and brake drum assembly, a brake drum comprising a shell having a generally radial web and an annular flange extending generally axially from the radially outer extremity of said web, a braking member fixed to said shell and including an annulus within and contacting said flange, said annulus being of a material suitable for frictional engagement with a friction device to brake the assembly and having integral circumferentially spaced mounting portions, a wheel structure including a rim concentric with said drum and circumferentially spaced mounting portions carried by said rim, and means for clamping said mounting portions of said wheel structure to said mounting portions of said annulus in direct surface-to-surface contacting relation therewith.

16. In a wheel and brake drum assembly as defined in claim 15, said mounting portions of said annulus being disposed in a common generally radial plane.

17. In a wheel and brake drum assembly, a brake drum comprising a braking member support including a generally radial web, a braking member fixed to said support and including an annulus extending generally axially from the radially outer extremity of said web, said annulus being of a material suitable for frictional engagement with a friction device to brake the assembly and having integral circumferentially spaced mounting portions, a wheel structure including a rim concentric with said drum and circumferentially spaced mounting portions carried by said rim, and means for clamping said mounting portions of said wheel structure to said mounting portions of said annulus in direct surface-to-surface contacting relation therewith.

References Cited in the file of this patent
UNITED STATES PATENTS

| | | |
|---|---|---|
| 2,037,982 | Hughes | Apr. 21, 1936 |
| 2,101,505 | Miller | Dec. 7, 1937 |
| 2,164,883 | Moore | July 4, 1939 |
| 2,173,591 | Miller et al. | Sept. 19, 1939 |